R. W. HAM.
TOBACCO SETTER.
APPLICATION FILED NOV. 16, 1912.

1,083,090. Patented Dec. 30, 1913.
2 SHEETS—SHEET 1.

Witnesses
C. F. Crawford,
D. W. Gould.

Inventor
R. W. Ham,
By Victor J. Evans
Attorney

R. W. HAM.
TOBACCO SETTER.
APPLICATION FILED NOV. 16, 1912.
1,083,090.
Patented Dec. 30, 1913.
2 SHEETS—SHEET 2.
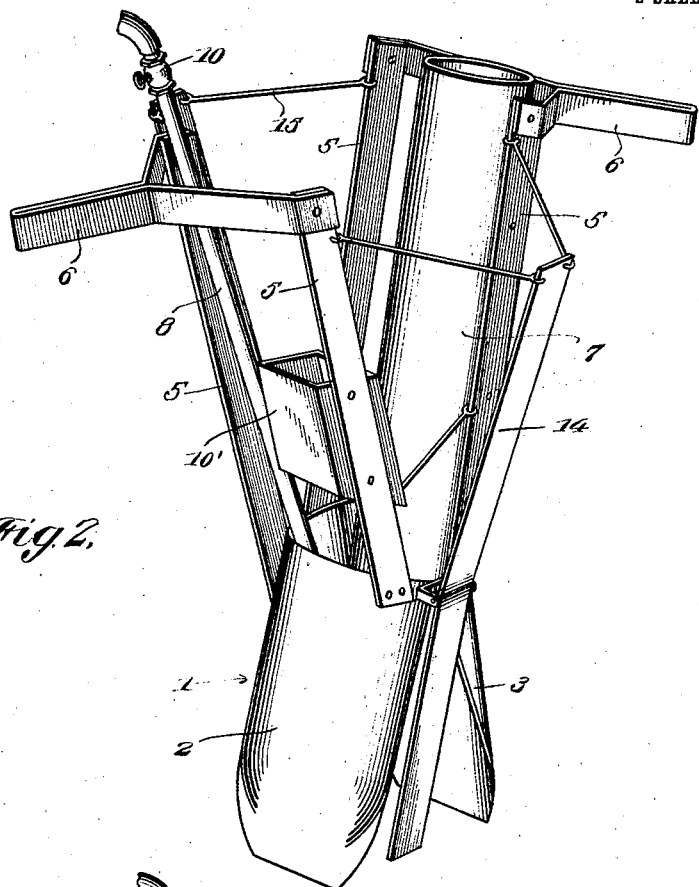
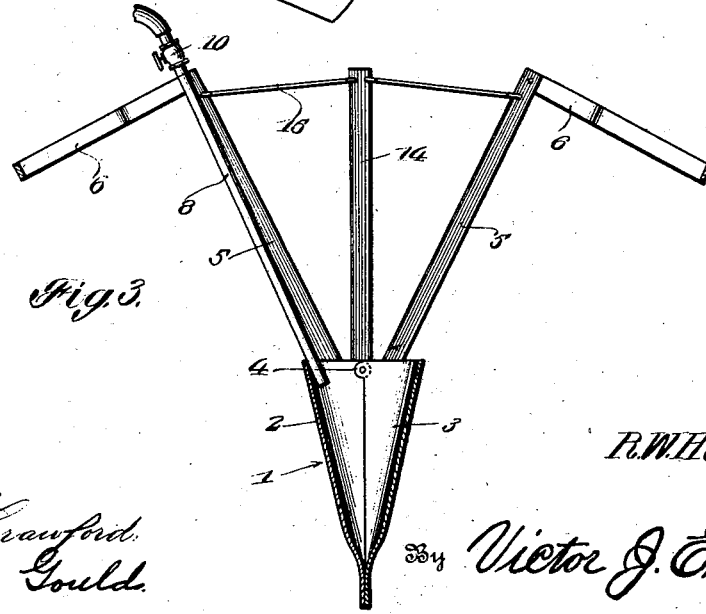

UNITED STATES PATENT OFFICE.

ROBERT W. HAM, OF RICHMOND, KENTUCKY.

TOBACCO-SETTER.

1,083,090.   Specification of Letters Patent.   Patented Dec. 30, 1913.

Application filed November 16, 1912. Serial No. 731,789.

*To all whom it may concern:*

Be it known that I, ROBERT W. HAM, a citizen of the United States, residing at Richmond, in the county of Madison and State of Kentucky, have invented new and useful Improvements in Tobacco-Setters, of which the following is a specification.

This invention relates to an implement designed particularly for setting tobacco plants and is constructed to permit the convenient placing of the plant in the ground, properly clamping the earth thereabout, and fertilizing and watering the plant simultaneously with the setting.

The main object of the present invention is the provision of an implement by which tobacco plants may be accurately set at the proper depth, the earth automatically clamped about the plant upon the conclusion of the setting operation and a regulated quantity of fertilizer and water delivered to the plant prior to the clamping of the earth thereabout.

The invention in its preferred form of details will be described in the following specification, reference being had to the accompanying drawing, in which:—

Figure 1:
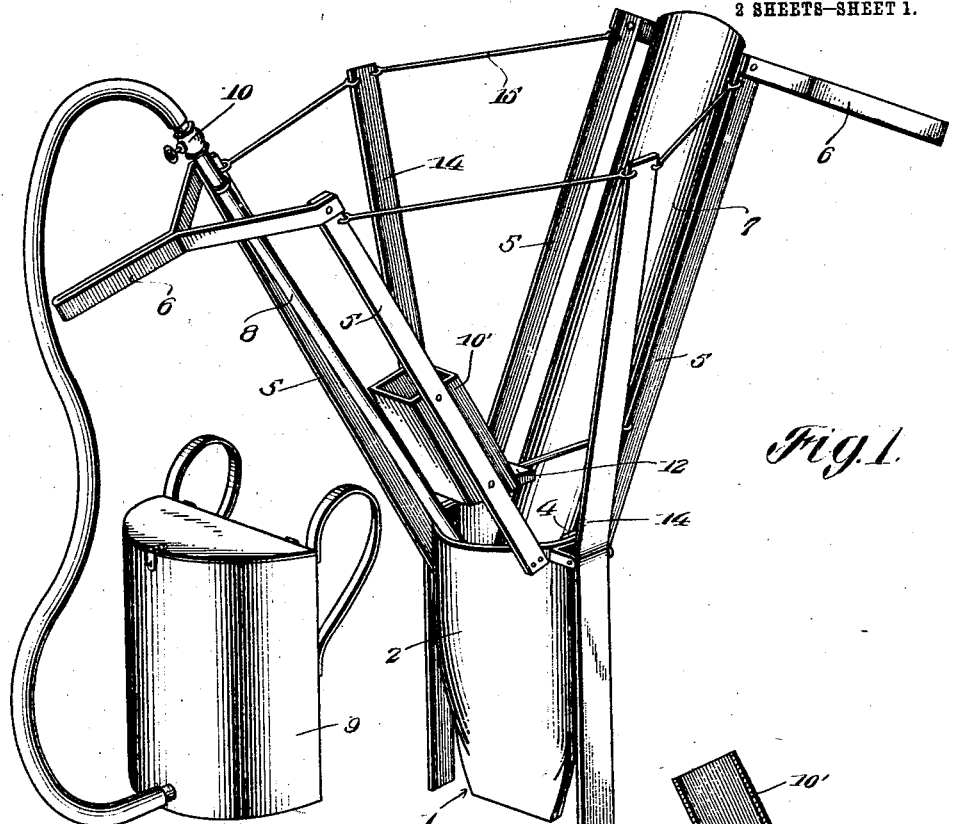
Figures 4, 5:
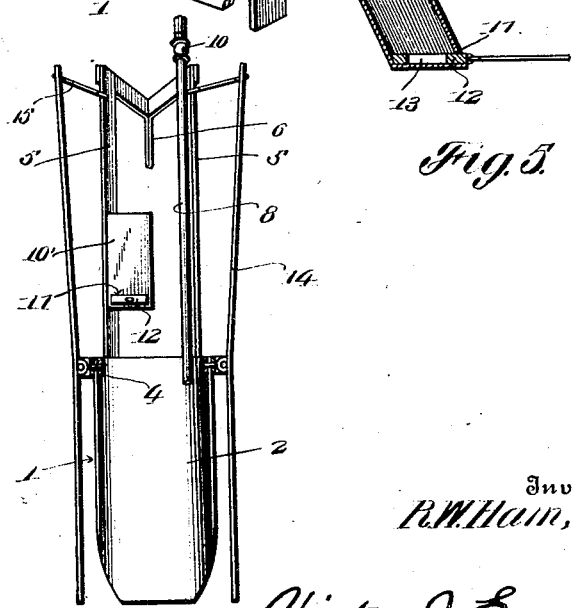

Figure 1 is a perspective view of the implement showing the same in open position assumed ready to set the plant. Fig. 2 is a similar view of the implement, the parts in the position assumed upon the completion of the setting operation. Fig. 3 is a vertical section of the same. Fig. 4 is a transverse section of the same. Fig. 5 is a detail of the fertilizer distributer.

Referring particularly to the accompanying drawings, the improved implement comprises a spreading member 1 made up of duplicate sections 2 and 3. The spreading member is practically of inverted conical formation except that for a portion of its length from the apex end the walls are more or less flattened. The upper or rounded ends of the sections of the spreading members are provided with ears 4 which are pivotally connected to permit a spreading action of the lower or free ends of the member in the operation of the device. From each section of the spreading member projects a handle frame including side bars 5 connected at their upper ends by a handle 6, the bars 5 being connected to the sections so that when the lower ends of said sections are closed the bars extend upwardly on divergent lines, so that in the manipulation of the handles 6 toward each other said sections will be spread at their lower ends. Secured between the bars 5 in one of the handle members is a tube 7 which may be hereinafter termed the feeding tube through which the plants are fed to be set, this tube preferably extending from the upper ends of the handle member to a point below the upper end of the spreading member so that the plants are delivered within the upper ends of the spreading member. Secured between the bars 5 of the other handle member is a tube 8 which is connected to a source of water supply 3, as a tank 9, carried for example on the back of the operator. A valve 10 is arranged in the pipe 8 so that the operator by the manipulation of said valve may control the water delivered through the pipe 8. The lower end of the pipe 8 is connected to one only of the bars 5 of the handle member in which said pipe is located, and terminates within the spreading member so that the water delivered from said lower end of the pipe 8 will fall within the hole provided for the plant. To the other bar 5 of the handle member carrying the water pipe is secured a fertilizer box 10' open at its upper end for the introduction of fertilizer and formed in the side next the feed pipe and immediately adjacent the bottom of the fertilizer box with an opening 11. A slide bar 12 operates in the fertilizer box extending through the opening 11 and connected to one of the opposing handle bars 5. The slide bar is preferably formed with an opening 13 so positioned that when the handle bars are brought together on the operation of the device the slide bar opening is introduced in the fertilizer box and when the handle bars are separated a quantity of the fertilizer is withdrawn from the box in the opening 13 and as said opening is moved beyond the edge of the fertilizer box the material will fall from the opening in through the spreading member and be thus delivered to the root of the plant.

Fingers 14 are pivotally mounted on ears projecting outwardly from the upper end of the spreading member, said fingers being located opposite end openings between the sections of the spreading member and terminating at their lower ends practically in alinement with the lower end of the spreading member. The fingers extend upwardly into practical alinement with the upper ends of the handle member and each finger is connected by rods 15 to the adjacent handle bar 5 of a handle member. The upper ends of the fingers incline upwardly and outwardly beyond the plane of the handle members so that when said handle members are moved together the fingers are separated at their upper ends and forced inwardly at their lower ends.

In the use of the device the implement is introduced into the ground with the handle members spread apart forming a hole through the closed sections of the spreading member. The plant is then fed through the feed tube into proper position in the hole thus formed and the handle members brought together to deliver fertilizer to the plant and the valve of the water pipe manipulated for the admission of the proper quantity of water to the plants. In bringing the handle members together the special fingers are also brought together with the result to force the earth about the root of the plant and hold it in proper position.

It will be obvious from the above description that I have provided an implement in the use of which tobacco plants or other plants may be conveniently and expeditiously set and properly watered and fertilized in the setting operation.

What is claimed is:

1. A plant setting implement including a spreading member made up of pivoted sections, handles connected to the sections to spread said sections, a water tube carried by one of the handles and terminating within the spreading member, a feed tube connected to the other handle member for the delivery of plants to the spreading member, and a fertilizer distributer automatically actuated in the movement of the handles.

2. A plant setting implement including a spreading member made up of pivoted sections, handles connected to the sections to spread said sections, a water tube carried by one of the handles and terminating within the spreading member, a feed tube connected to the other handle member for the delivery of plants to the spreading member, a fertilizer box carried by one of the handle members, a feed bar mounted in said box and a connection between said feed bar and a remaining handle to operate the feed bar in the movement of the handles.

3. A plant setting implement including a spreading member made up of pivoted sections, handles connected to the sections to spread said sections, a water tube carried by one of the handles and terminating within the spreading member, a feed tube connected to the other handle member for the delivery of plants to the spreading member, a fertilizer box carried by one of the handle members, a feed bar mounted in said box and a connection between said feed bar and a remaining handle to operate the feed bar in the movement of the handles, and fingers connected with the handles and acting in opposition to the spread of the sections of the spreading member, whereby when said spreading member sections are open the fingers are brought together.

In testimony whereof I affix my signature in presence of two witnesses.

ROBERT W. HAM.

Witnesses:
D. Tevis Hugely,
E. B. Smith.